United States Patent
LeFevre et al.

(10) Patent No.: US 11,845,227 B2
(45) Date of Patent: Dec. 19, 2023

(54) MICRO-WELDING USING A THREE-DIMENSIONAL PRINTER

(71) Applicant: Additive Technologies, LLC, Palm City, FL (US)

(72) Inventors: Jason M. LeFevre, Penfield, NY (US); Douglas K. Herrmann, Webster, NY (US); Paul J. McConville, Webster, NY (US); Chu-Heng Liu, Penfield, NY (US); Seemit Praharaj, Webster, NY (US)

(73) Assignee: Additive Technologies, LLC, Palm City, FL (US)

( * ) Notice: Subject to any disclaimer, the term of this patent is extended or adjusted under 35 U.S.C. 154(b) by 373 days.

(21) Appl. No.: 17/060,600

(22) Filed: Oct. 1, 2020

(65) Prior Publication Data

US 2022/0105684 A1    Apr. 7, 2022

(51) Int. Cl.
  *B29C 64/379*    (2017.01)
  *B29C 64/232*    (2017.01)
  (Continued)

(52) U.S. Cl.
  CPC ............ *B29C 64/379* (2017.08); *B23K 28/00* (2013.01); *B23K 37/04* (2013.01); *B23P 11/00* (2013.01); *B23P 17/00* (2013.01); *B29C 64/112* (2017.08); *B29C 64/209* (2017.08); *B29C 64/232* (2017.08); *B29C 64/236* (2017.08);
  (Continued)

(58) Field of Classification Search
  CPC .......... B22F 10/00; B22F 10/10; B22F 10/18; B22F 10/20; B22F 10/22; B22F 10/25; B22F 10/30; B22F 10/31; B22F 10/32; B22F 10/50; B22F 10/64; B22F 10/80; B22F 10/85; B22F 12/10; B22F 12/13; B22F 12/17; B22F 12/22; B22F 12/222; B22F 12/224; B22F 12/33; B22F 12/41; B22F 12/53; B22F 12/55; B22F 12/63; B22F 7/062; B22F 7/064; B29C 64/106; B29C 64/112; B29C 64/118; B29C 64/135; B29C 64/141; B29C 64/153; B29C 64/165; B29C 64/182; B29C 64/188; B29C 64/209; B29C 64/218; B29C 64/227; B29C 64/232; B29C 64/236; B29C 64/241; B29C 64/314; B29C 64/379; B29C 64/386; B29C 64/393; B29C 64/40; B23K 28/00; B23K 28/02; B23K 37/006; B23K 37/04; B23K 37/0406; B23K 37/0461; B23K 37/047; B23K 2103/08; B23K 2103/10; B23K 2103/12; B23K 2103/14; B23K 2103/18; B23K 2103/20; B23K 2103/24; B23P 17/00; B23P 11/00; B33Y 30/00; Y02P 10/25
  See application file for complete search history.

(56) References Cited

U.S. PATENT DOCUMENTS 4,314,132 A    2/1982  Porter
9,616,494 B2   4/2017  Vader et al.
(Continued)

*Primary Examiner* — Hung D Nguyen
(74) *Attorney, Agent, or Firm* — MH2 Technology Law Group LLP

(57) ABSTRACT

A three-dimensional (3D) printer is configured to introduce a liquid metal onto a first part and a second part while the first part and the second part are in contact with one another. The liquid metal subsequently solidifies to join the first part and the second part together to produce an assembly.

20 Claims, 8 Drawing Sheets

(51) Int. Cl.
- *B29C 64/236* (2017.01)
- *B29C 64/112* (2017.01)
- *B29C 64/241* (2017.01)
- *B29C 64/209* (2017.01)
- *B23K 28/00* (2006.01)
- *B23K 37/04* (2006.01)
- *B23P 17/00* (2006.01)
- *B23P 11/00* (2006.01)
- *B33Y 30/00* (2015.01)
- *B23K 103/10* (2006.01)

(52) U.S. Cl.
CPC ........ *B29C 64/241* (2017.08); *B23K 2103/10* (2018.08); *B33Y 30/00* (2014.12)

(56) References Cited

U.S. PATENT DOCUMENTS

| | | |
|---|---|---|
| 2004/0036200 A1 | 2/2004 | Patel et al. |
| 2010/0170879 A1* | 7/2010 | Kanaya ................ B23K 11/093 219/104 |
| 2012/0006810 A1 | 1/2012 | Fan et al. |
| 2015/0021815 A1 | 1/2015 | Albrecht et al. |
| 2016/0288264 A1 | 10/2016 | Jones et al. |
| 2016/0290880 A1* | 10/2016 | Lewis ....................... G01L 1/20 |
| 2020/0114467 A1 | 4/2020 | Nogami |
| 2021/0121947 A1* | 4/2021 | Mantell ................... B22F 3/115 |

* cited by examiner

MICRO-WELDING USING A THREE-DIMENSIONAL PRINTER

TECHNICAL FIELD

The present teachings relate generally to three-dimensional (3D) printing and, more particularly, to systems and methods for micro-welding two or more parts together using a 3D printer.

BACKGROUND

Gas tungsten arc welding (GTAW), also known as tungsten inert gas (TIG) welding or micro-TIG welding, is an arc welding process that uses a non-consumable tungsten electrode to produce the weld. The weld area and electrode are protected from oxidation or other atmospheric contamination by an inert shielding gas (e.g., argon or helium), and a filler metal is normally used.

GTAW is most commonly used to weld thin sections of stainless steel and non-ferrous metals such as aluminum, magnesium, and copper alloys. The process grants the operator greater control over the weld than competing processes such as shielded metal arc welding and gas metal arc welding, allowing for stronger, higher quality welds. However, GTAW is comparatively more complex and difficult to master, and furthermore, it is slower than most other welding techniques (e.g., less than 2 cm/minute).

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A system is disclosed. The system includes a three-dimensional (3D) printer that is configured to introduce a liquid metal onto a first part and a second part while the first part and the second part are in contact with one another. The liquid metal subsequently solidifies to join the first part and the second part together to produce an assembly.

In another embodiment, the system includes a gripper configured to grip a first part and a second part in a relative position with respect to one another. The system also includes an arm configured to move the gripper, the first part, and the second part in three dimensions while the gripper maintains the first part and the second part in the relative position with respect to one another. The system also includes a three-dimensional (3D) printer configured to introduce drops of a liquid metal onto the first part and the second part simultaneously with the arm moving the gripper, the first part, and the second part. The 3D printer is configured to introduce the drops of the liquid metal to form a substantially continuous line of the liquid metal on the first part and the second part at a rate from about 1 cm/second to about 25 cm/second, at a frequency from about 300 Hz to about 700 Hz, and with a spacing between drops from about 0.3 mm to about 0.7 mm. The drops of the liquid metal have an average cross-sectional length from about 200 μm to about 500 μm and an average mass from about 0.10 mg to about 0.30 mg. The liquid metal solidifies to join the first part and the second part together to produce an assembly.

A method is also disclosed. The method includes holding a first part and a second part in contact with one another. The method also includes moving the first part and the second part along a movement path while the first part and the second part are in contact with one another. The method also includes introducing drops of a liquid metal onto the first part and the second part using a three-dimensional (3D) printer while the first part and the second part are in contact with one another. The liquid metal solidifies to join the first part and the second part together in the position, thereby forming an assembly.

In another embodiment, the method includes holding a first part and a second part in a relative position with respect to one another. The method also includes moving the first part and the second part along a movement path while the first part and the second part are held in the relative position. The method also includes introducing drops of a liquid metal onto the first part, the second part, or both using a three-dimensional (3D) printer while the first part and the second part are held in the relative position.

In another embodiment, the method includes moving a first part along a movement path. The method also includes introducing drops of a liquid metal onto the first part using a three-dimensional (3D) printer. The drops of the liquid metal solidify to form a second part that is joined to the first part. The method also includes mechanically joining the second part to a third part.

In another embodiment, the method includes holding a first part and a second part in a relative position with respect to one another such that an end of the first part is adjacent to and faces an end of the second part. The method also includes moving the first part and the second part along a movement path while the first part and the second part are held in the relative position. The method also includes introducing drops of a liquid metal onto the first part and the second part using a three-dimensional (3D) printer while the first part and the second part are held in the relative position.

In another embodiment, the method includes holding a first part and a second part in a relative position with respect to one another such that an end of the first part is adjacent to and faces an end of the second part. The method also includes moving the first part and the second part along a movement path while the first part and the second part are held in the relative position. The method also includes depositing first and second sets of drops of a liquid metal onto the first part and the second part using a three-dimensional (3D) printer while the first part and the second part are held in the relative position. The first and second sets of the drops are deposited in a first direction, and the first and second sets of the drops are arranged in a second direction that is different from the first direction.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIG. 4A depicts a first set of drops of liquid metal deposited on the two parts, FIG. 4B depicts a second set of drops of liquid metal deposited on the two parts, and FIG. 4C depicts a third set of drops of liquid metal deposited on the two parts.

FIGS. 5A and 5B depict multiple sets of drops of liquid metal deposited in a first order, and FIG. 5C depicts multiple sets of drops of liquid metal deposited in a second, different order.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Figure 1:
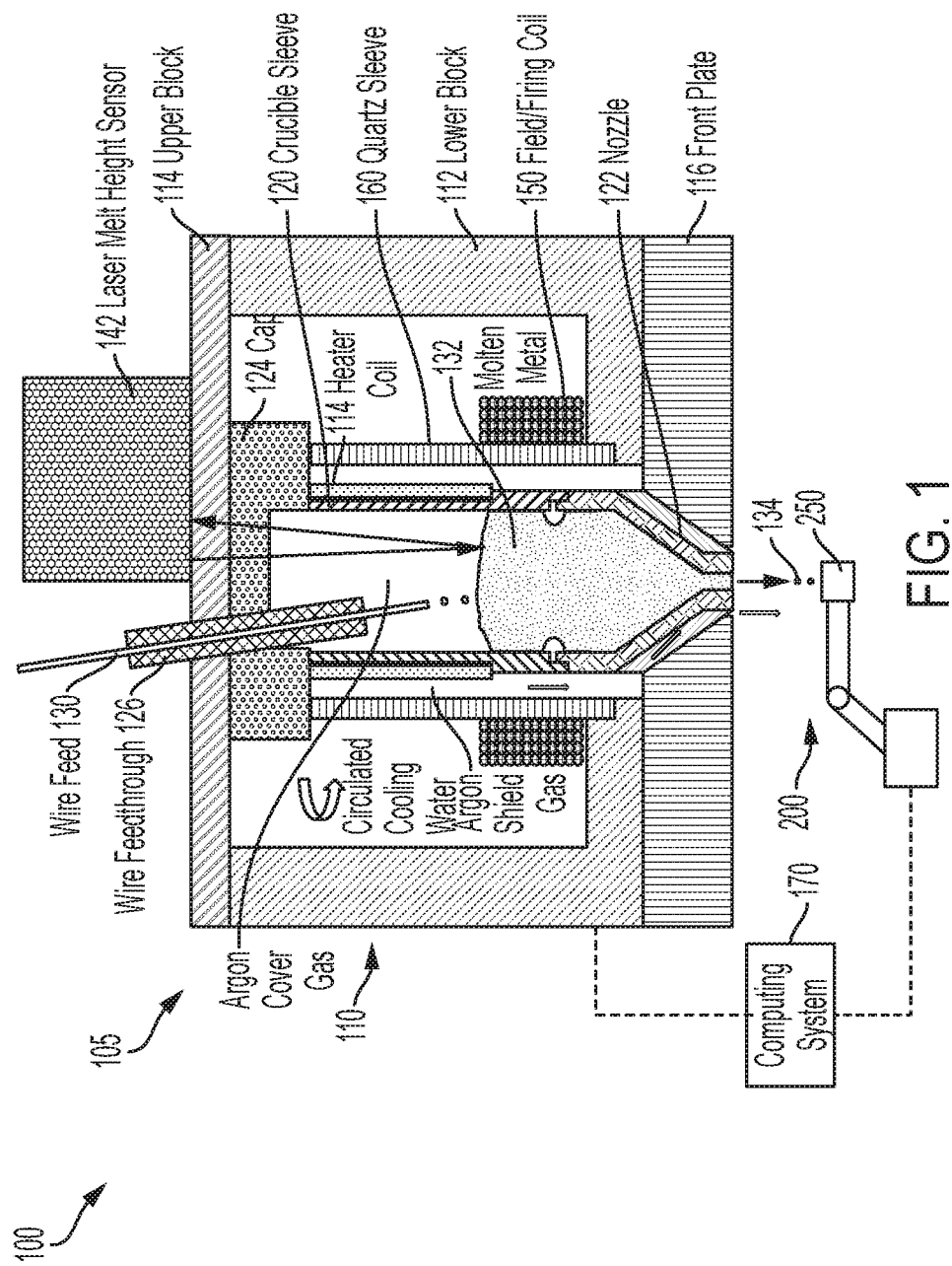
FIG. 1 depicts a schematic cross-sectional view of system for micro-welding, including a three-dimensional (3D) printer and a moveable arm, according to an embodiment.

FIG. 1 depicts a schematic cross-sectional view of a system 100 for joining (e.g., micro-welding) two parts together, according to an embodiment. The system 100 may include a 3D printer 105. The 3D printer 105 may be or include a magnetohydrodynamic (MHD) printer, which is suitable for jetting liquid metal and its alloys layer upon layer to form a 3D metallic object. As described below, the 3D printer 105 may also or instead be configured to jet the liquid metal and its alloys to join (e.g., micro-weld) two or more parts together. Thus, the 3D metallic object may be or include a weld material that is used to join (e.g., micro-weld) two or more parts together.

The 3D printer 105 may include an enclosure 110. The enclosure 110 may include a lower block 112 and an upper block 114. The lower block 112 and/or the upper block 114 may define an inner volume (also referred to as an atmosphere). As described below, a cooling fluid (e.g., water) may circulate through the inner volume to cool the 3D printer 105 during printing operations. The 3D printer 105 may also include a front plate 116 that is positioned on an opposite side of the lower block 112 from the upper block 114. The front plate 116 may be made of a ceramic material.

The 3D printer 105 may also include an ejector (also referred to as a crucible sleeve) 120. As shown, the ejector 120 may be positioned at least partially within the inner volume of the enclosure 110. In other embodiments, the ejector 120 may be positioned outside of the enclosure 110. The ejector 120 may be made of boron nitride. The ejector 120 may also define an inner volume (also referred to as a cavity). That inner volume of the ejector 120 may have a gas, such as argon or nitrogen, introduced thereto. The ejector 120 may also include a nozzle 122, which may extend through the lower block 112, the front plate 116, or both.

The 3D printer 105 may also include a cap 124 positioned at least partially within the inner volume of the enclosure 110. For example, the cap 124 may be positioned at least partially between the upper block 114 and the ejector 120.

The 3D printer 105 may also include a feedthrough 126 that extends through the upper block 114 and/or the cap 124 into the inner volume of the ejector 120. As shown, a printing material 130 may be introduced through the feedthrough 126 into the inner volume of the ejector 120. The printing material 130 may be or include a metal, a polymer, or the like. For example, the printing material 130 may be or include aluminum (e.g., 4008/356, 6061, 7075, etc.), copper, steel, zinc alloys, nickel alloys, or the like. In the example shown in FIG. 1, the printing material 130 may be or include aluminum (e.g., a spool of aluminum wire).

The 3D printer 105 may also include one or more heating elements 140. The heating elements 140 may be or include graphite coils. As shown, the heating elements 140 may be positioned at least partially within the inner volume of the enclosure 110 and at least partially outside (e.g., around) the ejector 120. In other embodiments, the heating elements 140 may be positioned outside of the enclosure 110. The heating elements 140 are configured to melt the printing material 130, thereby converting the printing material 130 from a solid material to a liquid material (e.g., liquid aluminum) 132 within the inner volume of the ejector 120.

The 3D printer 105 may also include a melt height sensor 142. The melt height sensor 142 may be positioned above the upper block 114 and may be configured to measure a height and/or volume of the liquid metal 132 within the ejector 120 (e.g., using a laser).

The 3D printer 105 may also include one or more metallic coils 150 that are wrapped at least partially around the ejector 120. A power source may be coupled to the coils 150 and configured to provide an electrical current thereto. In one embodiment, the power source may be configured to provide a step function direct current (DC) voltage profile (e.g., voltage pulses) to the coils 150, which may create an increasing magnetic field. The increasing magnetic field may cause an electromotive force within the ejector 120, that in turn causes an induced electrical current in the liquid metal 132. The magnetic field and the induced electrical current in the liquid metal 132 may create a radially inward force on the liquid metal 132, known as a Lorenz force. The Lorenz force creates a pressure at an inlet of the nozzle 122. The pressure causes the liquid metal 132 to be jetted through the nozzle 122 in the form of one or more drops 134.

The 3D printer 105 may also include a sleeve 160 that is positioned at least partially within the inner volume of the enclosure 110. The sleeve 160 may be or include a gold-plated quartz sleeve that is positioned at least partially (e.g., radially) between the ejector 120 and the coils 150. In at least one embodiment, a shield gas, such as argon or nitrogen, may be positioned between the ejector 120 and the sleeve 160.

The system 100 may also include a moveable arm 200. The arm 200 may be positioned at least partially above or below the 3D printer 105. For example, the arm 200 may be positioned at least partially above or below the nozzle 122. The arm 200 may include a gripper (also referred to as a fixture) 250 that is configured to hold two or more parts while the 3D printer 105 joins (e.g., micro-welds) them together, as discussed below. The arm 200 may position the gripper relative to the nozzle 122 (e.g., above or below the nozzle 122). The arm 200 may be configured to move the gripper 250 and the two or more parts therein in one, two, or three dimensions. The arm 200 may also or instead be configured to pivot or rotate the gripper 250 and the two or more parts therein in one, two, or three dimensions. In one embodiment, the arm 200 and/or the gripper 250 may have a heater 252 coupled thereto and/or positioned therein.

The system 100 may also include a computing system 170 that may be configured to control the 3D printer 105, the arm 200, or both. For example, the computing system may be configured to control the ejection of the drops 134 from the nozzle 122 and control the movement of the arm 200. Thus, as discussed in greater detail below, the computing system 170 may be configured to cause the arm 200 to move the gripper 250 and the parts therein through a predetermined movement path under the nozzle 122 while simultaneously causing the 3D printer 105 to jet/deposit the drops 134 onto the parts to join (e.g., micro-weld) the parts together.

Figure 2:
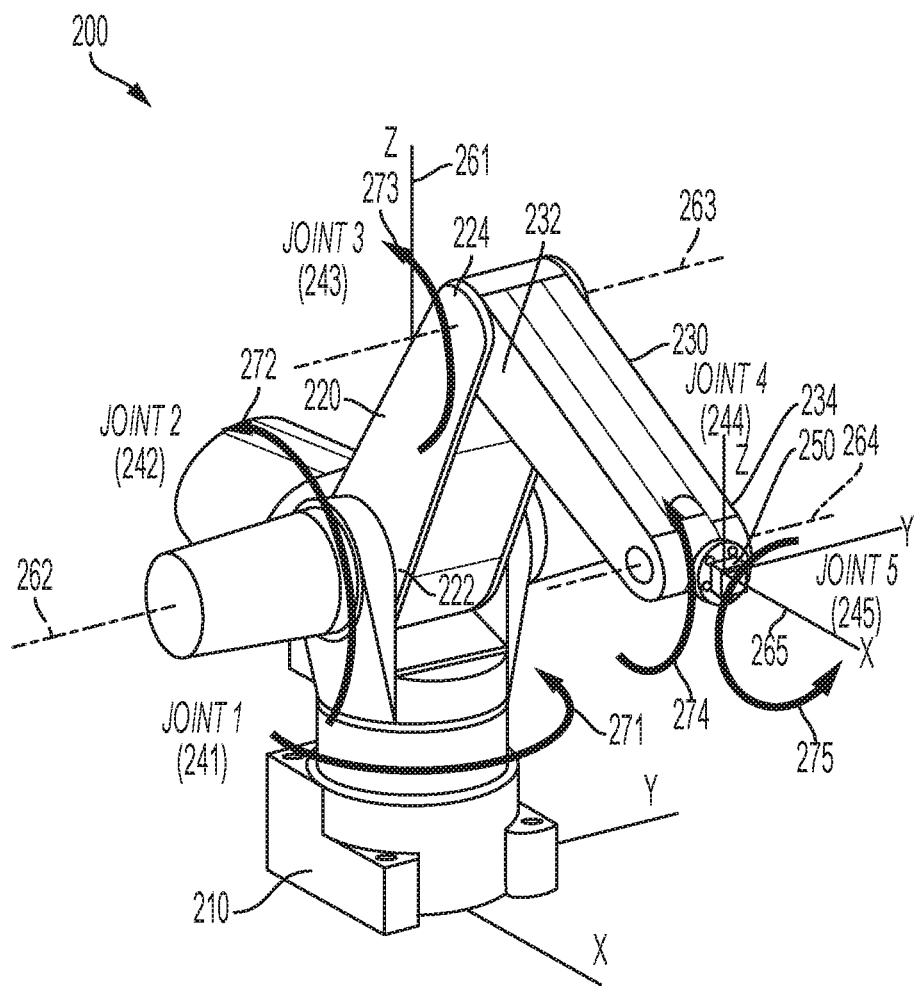
FIG. 2 depicts a schematic perspective view of the moveable arm, according to an embodiment.

FIG. 2 depicts a schematic perspective view of the arm 200, according to an embodiment. The arm 200 may include a base 210, one or more segments (two are shown: 220, 230), one or more joints (five are shown: 241-245), the gripper 250, or a combination thereof. In the embodiment shown, the base 210 may be coupled to a first end 222 of the first arm 220 via one or more of the joints (e.g., joints 241, 242), a second end 224 of the first arm 220 may be coupled to a first end 232 of the second arm 230 via one or more of the joints (e.g., joint 243), and a second end 234 of the second arm 230 may be coupled to the gripper 250 via one or more of the joints (e.g., joints 244, 245).

The first joint 241 may allow the base 210 and/or the first segment 220 to pivot or rotate around a central longitudinal axis 261 through the base 210, as shown by the arrow 271. The second joint 242 may allow the first segment 220 to pivot or rotate around an axis 262 through the first end 222 of the first segment 220, as shown by the arrow 272. The axes 261, 262 may be substantially perpendicular to one another. The third joint 243 may allow the second segment 230 to pivot or rotate around an axis 263 through the second end 224 of the first segment 220 and/or the first end 232 of the second segment 230, as shown by the arrow 273. The axes 262, 263 may be substantially parallel to one another. The fourth joint 244 may allow the gripper 250 to pivot or rotate around an axis 264 through the second end 234 of the second segment 230, as shown by the arrow 274. The axes 263, 264 may be substantially parallel to one another. The fifth joint 245 may allow the gripper 250 to pivot or rotate around an axis 265 through the second end 234 of the second segment 230, as shown by the arrow 275. The axes 264, 265 may be substantially perpendicular to one another.

Thus, as mentioned above, the segments 220, 230 and joints 241-245 may allow the gripper 250 to move, pivot, and/or rotate in one, two, or three dimensions with respect to the 3D printer 105 (e.g., with respect to the nozzle 122). In another embodiment, the nozzle 122 may also or instead be configured to move, pivot, or rotate in one, two, or three dimensions with respect to the arm 200 (e.g., with respect to the gripper 250).

FIGS. 3A-3F depict schematic views of the gripper 250 gripping/holding two or more parts so that the parts may be joined (e.g., micro-welded) together by a weld material 340 that is deposited by the 3D printer 105, according to an embodiment. The parts and/or the weld material 340 may be made from metal, polymer, ceramic, or a combination thereof. In one embodiment, the parts and/or the weld material 340 may be made from materials that are weld compatible to/with each other. For example, the parts and/or the weld material 340 may be made from the same material. The material for the parts and/or the weld material 340 may be or include aluminum (e.g., 4008/356, 6061, 7075, etc.), copper, steel, zinc alloys, nickel alloys, or the like. In an example, the parts may be or include pre-cut sheet stock, castings, bar or plate stock, tubular stock, pre-machined or otherwise formed components, etc.

Figure 3A:
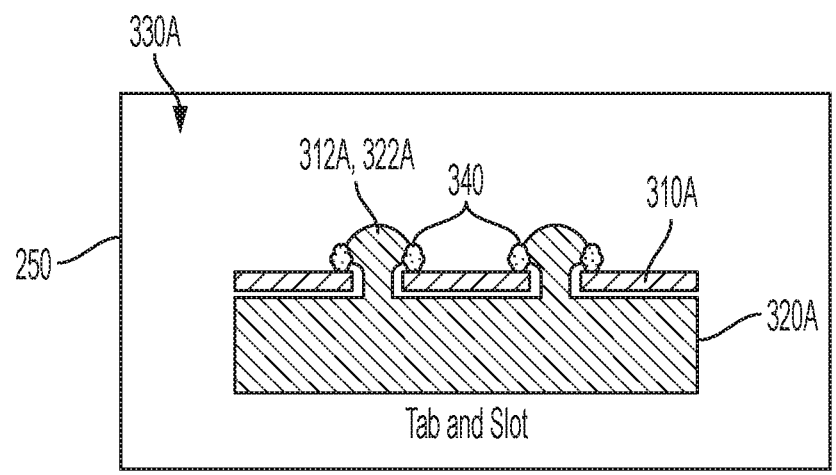
FIG. 3A depicts a schematic cross-sectional view of a gripper of the arm gripping/holding two parts so that the 3D printer can micro-weld the two parts together to form a tab and slot assembly, according to an embodiment.

More particularly, FIG. 3A depicts a schematic cross-sectional view of two parts 310A, 320A positioned at least partially within (e.g., being gripped/held by) the gripper 250. As shown, the first part 310A may include a slot 312A, and the second part 320A may include a tab 322A that is configured to be positioned at least partially within the slot 312A. For example, the tab 322A may be inserted into the slot 312A, and the gripper 250 may hold the parts 310A, 320A in this position relative to one another. The 3D printer 105 may then deposit the drops 134 onto the parts 310A, 320A. More particularly, the 3D printer 105 may deposit the drops 134 onto an intersection between the parts 310A, 320A. The drops 134 may solidify to form a weld material 340 that joins (e.g., micro-welds) the parts 310A, 320A together as a tab and slot assembly 330A.

Figure 3B:
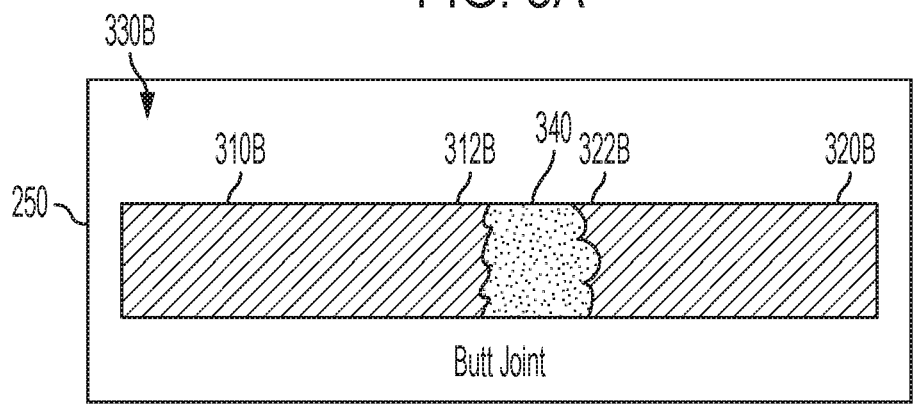
FIG. 3B depicts a schematic cross-sectional view of the gripper gripping/holding two parts so that the 3D printer can micro-weld the two parts together to form a butt joint assembly, according to an embodiment.

FIG. 3B depicts another schematic cross-sectional view of two parts 310B, 320B positioned at least partially within (e.g., being gripped/held by) the gripper 250. As shown, an end 312B of the first part 310 may be positioned adjacent to an end 322B of the second part 320B. The ends 312B, 322B may be spaced apart by a predetermined distance (e.g., from about 0.1 mm to about 5 mm or about 0.5 mm to about 2 mm) such that a gap is present between the ends 312B, 322B, and the gripper 250 may hold the parts 310B, 320B in this position relative to one another. The 3D printer 105 may then deposit the drops 134 into the gap between the parts 310B, 320B such that the drops 134 contact both ends 312B, 322B. The drops 134 may solidify to form the weld material 340 that joins (e.g., micro-welds) the parts 310B, 320B together as a butt joint assembly 330B.

Figure 3C:
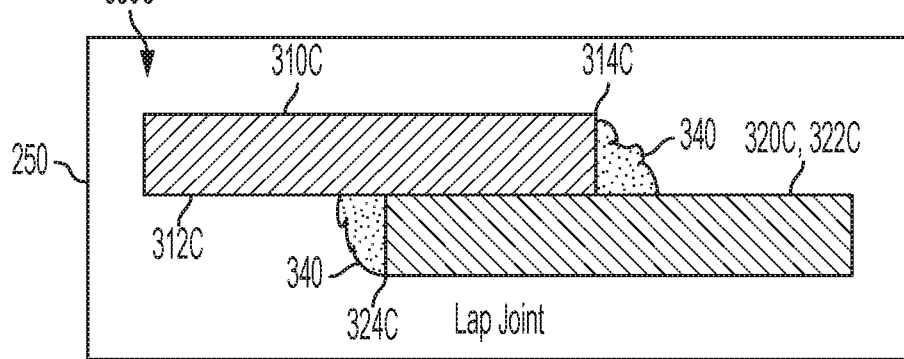
FIG. 3C depicts a schematic cross-sectional view of the gripper gripping/holding two parts so that the 3D printer can micro-weld the two parts together to form a lap joint assembly, according to an embodiment.

FIG. 3C depicts another schematic cross-sectional view of two parts 310C, 320C positioned at least partially within (e.g., being gripped/held by) the gripper 250. The parts 310C, 320C may be at least partially overlapping one another. For example, a side 312C of the first part 310C may be in contact with a side 322C of the second part 320C. The gripper 250 may hold the parts 310C, 320C in this position relative to one another. The 3D printer 105 may then deposit a first set of drops 134 into contact with the side 312C of the first part 310C and an end 324C of the second part 320C, and a second set of drops 134 into contact with the side 322C of the second part 320C and an end 314C of the first part 310C. The drops 134 may solidify to form the weld material 340 that joins (e.g., micro-welds) the parts 310C, 320C together as a lap joint assembly 330C.

Figure 3D:
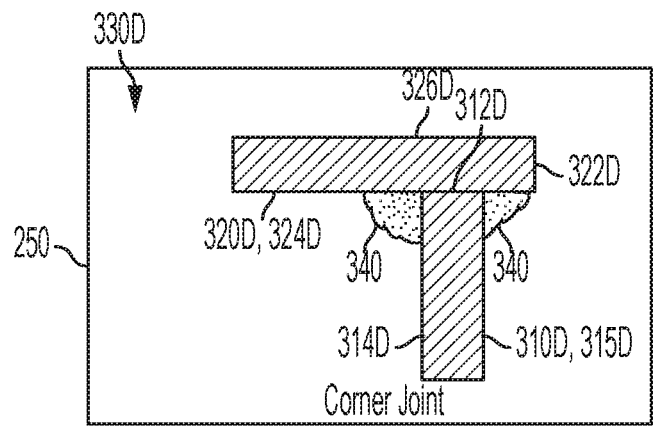
FIG. 3D depicts a schematic cross-sectional view of the gripper gripping/holding two parts so that the 3D printer can micro-weld the two parts together to form a corner joint assembly, according to an embodiment.

FIG. 3D depicts another schematic cross-sectional view of two parts 310D, 320D positioned at least partially within (e.g., being gripped/held by) the gripper 250. As shown, an end 312D of the first part 310D may be in contact with a side 324D of the second part 320D. In this particular embodiment, the end 312D may be located closer to an end 322D of the second part 320D than a middle 326D of the second part 320D. The gripper 250 may hold the parts 310D, 320D in this position relative to one another. The 3D printer 105 may then deposit the drops 134 into contact with sides 314D, 315D of the first part 310D and the side 324D of the second part 320D. The drops 134 may solidify to form the weld material 340 that joins (e.g., micro-welds) the parts 310D, 320D together as a corner joint assembly 330D.

Figure 3E:
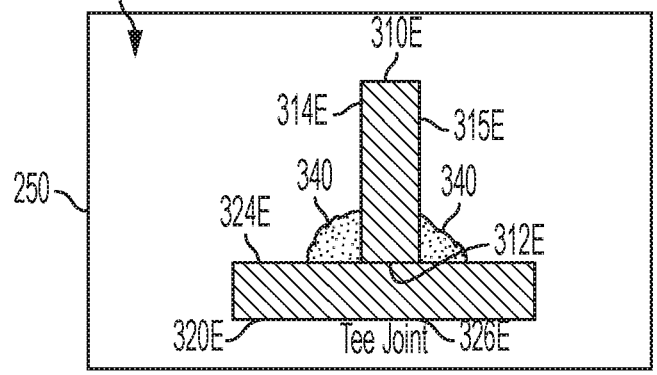
FIG. 3E depicts a schematic cross-sectional view of the gripper gripping/holding two parts so that the 3D printer can micro-weld the two parts together to form a tee joint assembly, according to an embodiment.

FIG. 3E depicts another schematic cross-sectional view of two parts 310E, 320E positioned at least partially within (e.g., being gripped/held by) the gripper 250. As shown, an end 312E of the first part 310E may be in contact with a side 324E of the second part 320E. In this particular embodiment, the end 312E may be located at or proximate to a middle 326E of the second part 320E. The gripper 250 may hold the parts 310E, 320E in this position relative to one another. The 3D printer 105 may then deposit the drops 134 into contact with sides 314E, 315E of the first part 310E and the side 324E of the second part 320E. The drops 134 may solidify to form the weld material 340 that joins (e.g., micro-welds) the parts 310E, 320E together as a tee joint assembly 330E.

Figure 3F:
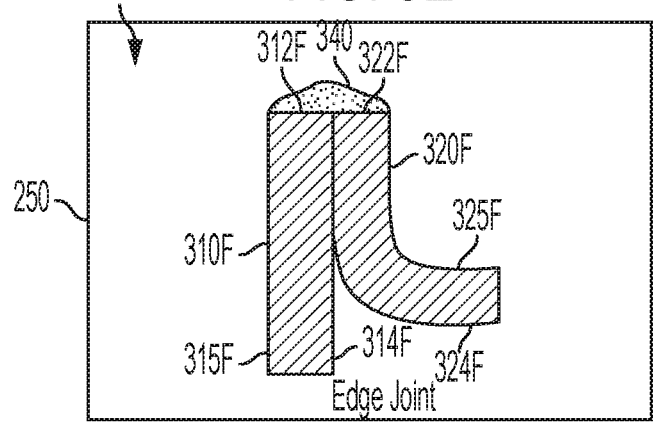
FIG. 3F depicts a schematic cross-sectional view of the gripper gripping/holding two parts so that the 3D printer can micro-weld the two parts together to form an edge joint assembly, according to an embodiment.

FIG. 3F depicts another schematic cross-sectional view of two parts 310F, 320F positioned at least partially within (e.g., being gripped/held by) the gripper 250. As shown, a side 314F of the first part 310F may be in contact with a side 324F of the second part 320F. In this embodiment, the second part 320F is substantially curved and/or L-shaped; however, in other embodiments, the second part 320F may be substantially straight. The 3D printer 105 may then deposit the drops 134 into contact with ends 312F, 322F of the parts 310F, 320F. The drops 134 may solidify to form the weld material 340 that joins (e.g., micro-welds) the parts 310F, 320F together as an edge joint assembly 330F. In at least one embodiment, neither the drops 134 nor the weld material 340 may contact the sides 314F, 315F, 324F, 325F of the parts 310F, 320F.

Figure 3G:
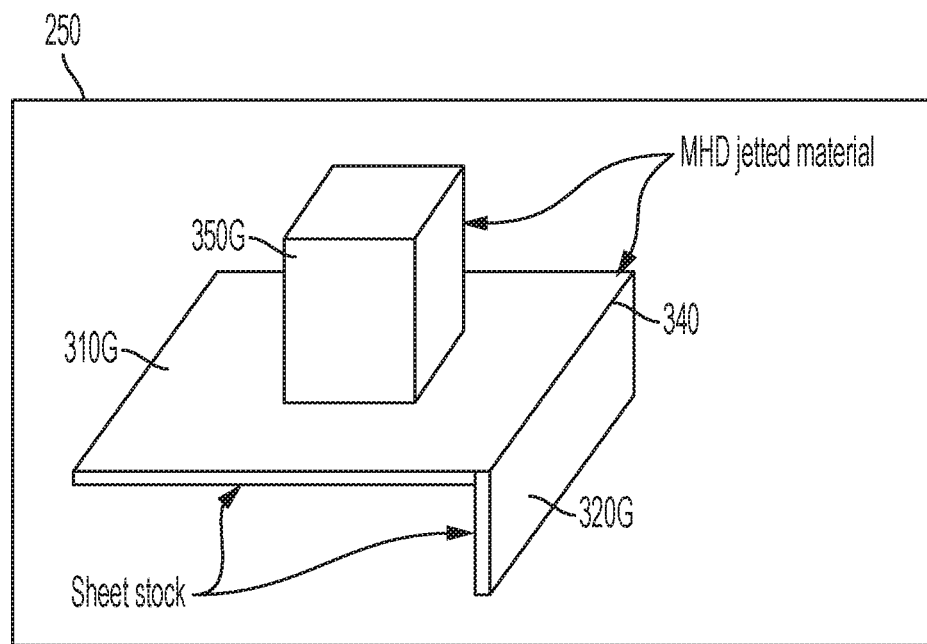
FIG. 3G depicts a schematic cross-sectional view of the gripper gripping/holding two parts so that the 3D printer can micro-weld the two parts together and also deposit additional material onto one or both parts to form a third part, according to an embodiment.

FIG. 3G depicts another schematic cross-sectional view of two parts 310G, 320G positioned at least partially within (e.g., being gripped/held by) the gripper 250. The first and second parts 310G, 320G may be or include sheet stock. The first part 310G may be in contact with the second part 320G. The 3D printer 105 may deposit a first set of drops 134 onto the parts 310G, 320G proximate to where the parts 310G, 320G contact one another. The first set of drops 134 may solidify to form the weld material 340 that joins (e.g., micro-welds) the parts 310G, 320G together to form an assembly.

In addition, before or after the parts 310G, 320G are joined together, the printer 105 may also deposit a second set of drops 134 onto the first part 310G, the second part 320G, or both. In the example shown, the second set of drops 134 may be deposited on the first part 310G but not the second part 320G. In another example, the second set of drops 134 may be deposited on the second part 320G but not the first part 320G. In yet another example, the second set of drops 134 may contact both parts 310G, 320G. The second set of drops 134 may cool and solidify to form a third part 350G. In the example shown, the third part 350G is joined with the first part 310G but not the second part 320G. In this particular example, neither the second set of drops 134 nor the third part 350G may be used to join the parts 310G, 320G together. In other words, the third part 350G may serve a different function than joining the parts 310G, 320G together.

Figure 3H:
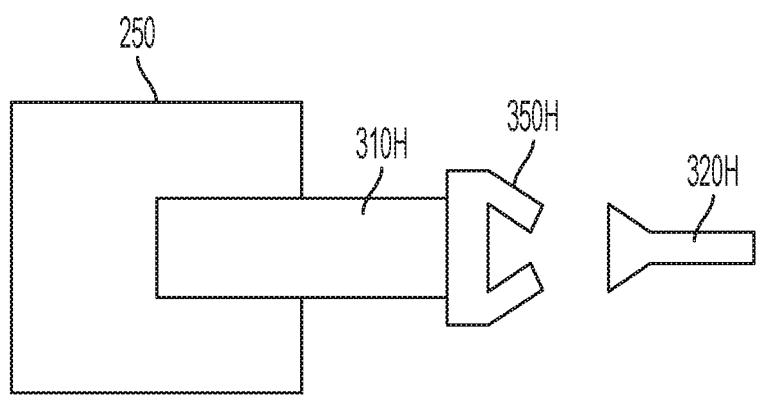
FIG. 3H depicts a schematic cross-sectional view of the gripper gripping/holding the first part so that the 3D printer can print a second part onto the first part, wherein the second part is configured to be mechanically joined with a third part, according to an embodiment.

FIG. 3H depicts another schematic cross-sectional view of a first part 310H positioned at least partially within (e.g., being gripped/held by) the gripper 250. In one or more of the examples above, the parts 310A-310G, 320A-320G and/or the weld material 340 are made from material(s) that is/are weld compatible with one another. For example, the parts the parts 310A-310G, 320A-320G and/or the weld material 340 may be made from the same material.

However, in the example in FIG. 3H, one of the parts 320H is made from a material that is not weld compatible (or is less weld compatible) with the other part 310H and/or the weld material 340. For example, the second part 320H may be made from a different material than the first part 310H and/or the weld material 340. In other words, the weld material 340 may not bond to the second part 320H as well as it bonds to the first part 310H. As a result, the parts 310H, 320H may not be joined (e.g., micro-welded) together in the same manner as described above because the weld material 340 may not form a sufficient bond to/with the second part 320H.

The first part 310H and/or the weld material 340 may be made from aluminum (e.g., 4008/356, 6061, 7075, etc.), copper, steel, zinc alloys, nickel alloys, or the like. The second part 320H may be made from a material that can be in contact with the high heat (e.g., 500° C.+) generated by the MHD process without deformation or degradation. For example, the second part 320H may be made from titanium, tungsten, stainless steel, brass, bronze, silicon carbide, ceramic, glass, natural stone, cement, silicone, etc.

The second part 320H may be positioned outside of the gripper 250 (as shown), or the second part 320H may be positioned at least partially within the gripper 250 (not shown). The weld material 340 may be deposited onto the first part 310H, and the weld material 340 may cool and solidify to form a third part 350H that is joined (e.g., micro-welded) to the first part 310H. The third part 350H may be shaped and sized to mechanically join/lock with the second part 320H (e.g., via a dovetail joint, pin style joint, tapered mortise and tendon, tapered tongue and groove, etc.) Thus, the third part 350H may be used to mechanically join/lock the first and second parts 310H, 320H together to form the assembly. In one example, the second and third parts 320H, 350H may be mechanically joined/locked together using the 3D printer 105, the arm 200, the gripper 250, or a combination thereof. In another example, the second and third parts 320H, 350H may be mechanically joined/locked together manually after one or both is/are removed from the gripper 250. In another embodiment, the joint may also or instead be held together with a fastener (e.g., a screw, a rivet, a pin, etc.), and the 3D printer 105 may deposit the weld material 340 to build the fastener into the joint.

Figure 4A:
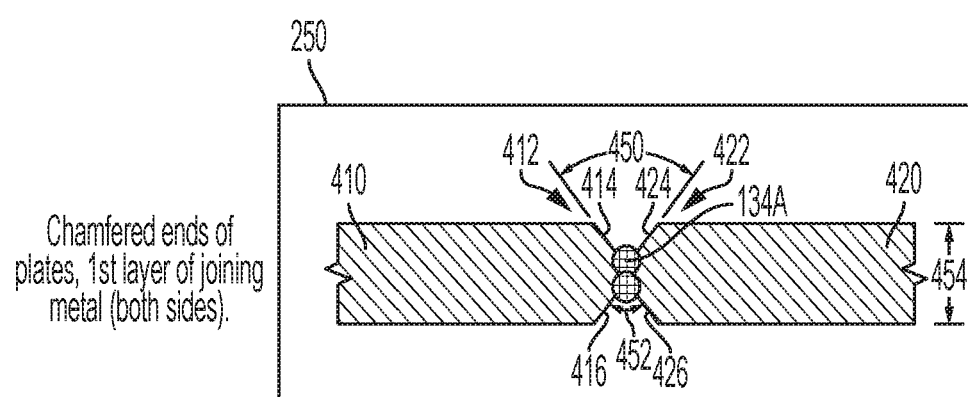
FIGS. 4A-4C depict schematic cross-sectional views of the gripper gripping/holding two thick parts so that the 3D printer can micro-weld the two thick parts together to form a butt joint assembly, according to an embodiment. More particularly.
Figure 4B:
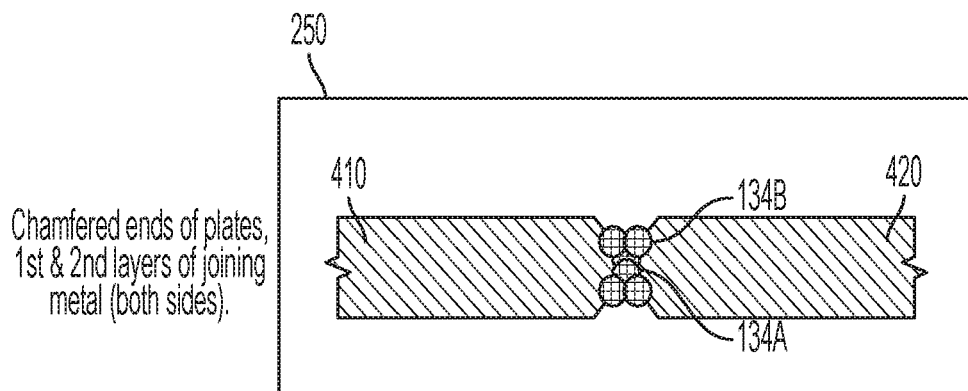
Figure 4C:
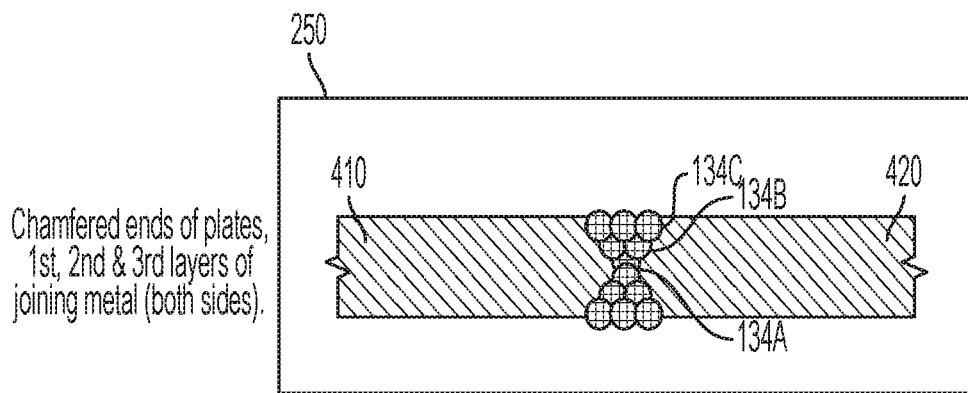

FIGS. 4A-4C illustrate schematic cross-sectional views of two thick parts 410, 420 being joined (e.g., micro-welded) together to form a butt joint assembly. The parts 410, 420 may be or include plates. The parts 410, 420 may have a thickness 454 from about 1 mm to about 50 mm or about 3 mm to about 50 mm. Ends 412, 422 of the parts 410, 420 may be chamfered. Thus, an upper surface 414 of the end 412 may be oriented at an angle 450 with respect to an upper surface 424 of the end 422. The angle 450 may be from about 10° to about 150°, about 30° to about 120°, or about 50° to about 90°. Similarly, a lower surface 416 of the end 412 may be oriented at an angle 452 with respect to a lower surface 426 of the end 422. The angle 452 may be from about 10° to about 150°, about 30° to about 120°, or about 50° to about 90°.

In one embodiment, the ends 412, 422 may be in contact with one another. As shown, in another embodiment, the ends 412, 422 may be adjacent to one another (e.g., facing one another); however, a gap may exist between the ends 412, 422. The gap may be from about 0.1 mm to about 5 mm, or about 0.5 mm to about 3 mm. As shown in FIG. 4A, a first set of the drops 134A may be deposited at least partially between the ends 412, 422. The first set of drops may contact both ends 412, 422. The first set of drops 134A may be positioned proximate to an inner (e.g., middle portion) of the ends 412, 422 (e.g., proximate to the chamfered points of the ends 412, 422).

As shown in FIG. 4B, a second set of drops 134B may be deposited after the first set of drops 134A is deposited. The second set of drops 134B may be positioned at least partially between the ends 412, 422. The second set of drops 134B may contact both ends 412, 422. The second set of drops 134B may be positioned at least partially around the first set of drops 134A. For example, as shown in FIG. 4B, the second set of drops 134B may be positioned above and/or below the first set of drops 134A. Due to the angles 450, 452 at which the ends 412, 422 are oriented, the second set of drops 134B may have a greater width than the first set of drops 134A.

As shown in FIG. 4C, a third set of drops 134C may be deposited after the second set of drops 134B is deposited. The third set of drops 134C may be positioned at least partially between the ends 412, 422. The third set of drops 134C may contact both ends 412, 422. The third set of drops 134C may be positioned at least partially around the first set of drops 134A and/or the second set of drops 134B. For example, as shown in FIG. 4C, the third set of drops 134C may be positioned above and/or below the second set of drops 134B. The third set of drops 134C may be positioned proximate to outer portions of the ends 412, 422 and distal to the middle portion of the ends 412, 422. In other words, the third set of drops 134C may be positioned proximate to upper and/or lower surfaces of the parts 410, 420. Due to the angles 450, 452 at which the ends 412, 422 are oriented, the third set of drops 134C may have a greater width than the second set of drops 134B.

The drops 134A-134C may cool and solidify to form the weld material 340 that joins (e.g., micro-welds) the parts 410, 420 together as the butt joint assembly. In one embodiment, the first set of drops 134A may at least partially cool and/or solidify prior to the second set of drops 134B being deposited, and the second set of drops 134B may at least partially cool and/or solidify prior to the third set of drops 134C being deposited. In another embodiment, the second set of drops 134B may be deposited onto the first set of drops 134A while the first set of drops 134A is still in a substantially liquid state, and the third set of drops 134C may be deposited onto the second set of drops 134B while the second set of drops 134A is still in a substantially liquid state. In this embodiment, the drops 134A-134C may cool and solidify together.

Figure 5A:
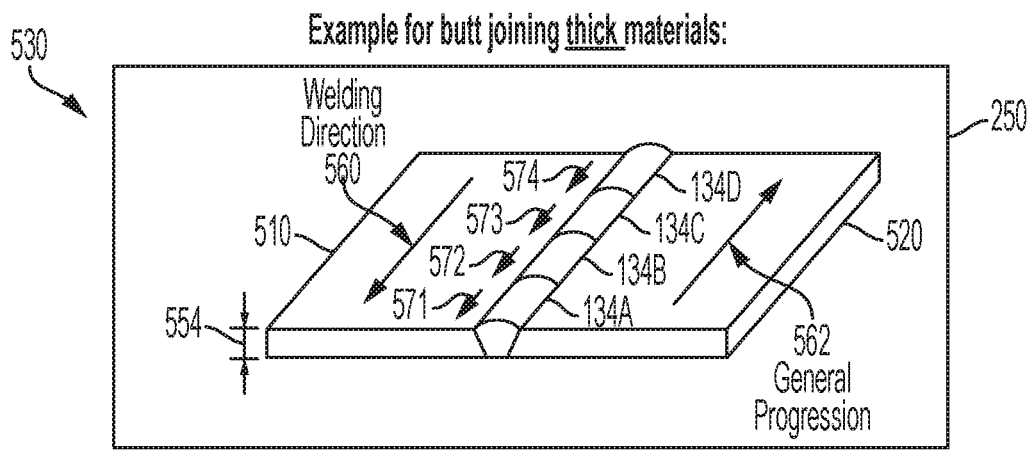
FIGS. 5A-5C depict schematic perspective views of the gripper gripping/holding two thin parts so that the 3D printer can micro-weld the two thin parts together to form a butt joint assembly, according to an embodiment. More particularly.
Figure 5B:
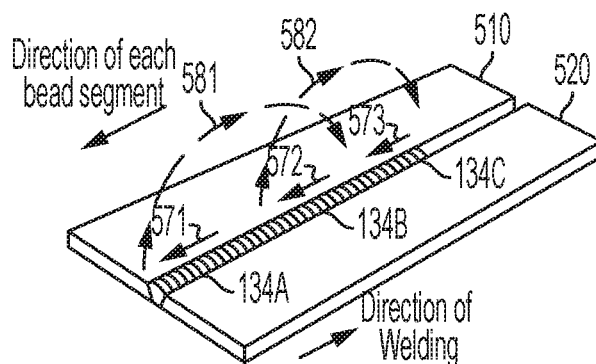
Figure 5C:
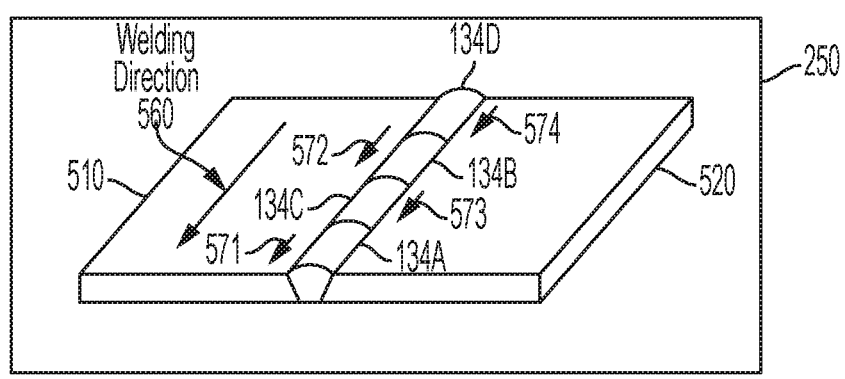

FIGS. 5A-5C illustrate schematic perspective views of two thin parts 510, 520 being joined (e.g., micro-welded) together to form a butt joint assembly 530. The parts 510, 520 may be or include plates. The parts 510, 520 may have a thickness 554 from about 0.2 mm to about 2 mm. Ends 512, 522 of the parts 510, 520 may be chamfered. For example, the ends may be oriented at an angle with respect one another such that a distance between the ends increases proceeding in a vertical direction (e.g., upward). The angle may be from about 10° to about 150°, about 30° to about 120°, or about 50° to about 90°.

As shown in FIGS. 5A and 5B, the drops may be deposited in a plurality of sets (four are shown: 134A-134D). Each set of drops 134A-134D may be deposited in a first direction 560; however, the sets of drops 134A-134D may be ordered/arranged in a second direction 562 that is different than (e.g., opposite to) the first direction 560. In other words, the different sets of drops 134A-134D are not printed directly adjacent to each other, for the reasons described below.

In the example shown, the arm 200 may move the gripper 250 and the parts 510, 520 in the second direction 562 with respect to the nozzle 122 to allow the first set of drops 134A to be deposited in the first direction 560, as shown by arrow 571. After the first set of drops 134A has been deposited, the arm 200 may move the gripper 250 and the parts 510, 520 in the first direction 560 with respect to the nozzle 122, as shown by the arrow 581 in FIG. 5B. Then, the arm 200 may move the gripper 250 and the parts 510, 520 in the second direction 562 with respect to the nozzle 122 to allow the second set of drops 134B to be deposited in the first direction 560, as shown by arrow 572, such that the second set of drops 134B proceeds toward the first set of drops 134A. After the second set of drops 134B has been deposited, the arm 200 may move the gripper 250 and the parts 510, 520 in the first direction 560 with respect to the nozzle 122, as shown by the arrow 582 in FIG. 5B. Then, the arm 200 may move the gripper 250 and the parts 510, 520 in the second direction 562 with respect to the nozzle 122 to allow the third set of drops 134C to be deposited in the first direction 560, as shown by arrow 573, such that the third set of drops 134C proceeds toward the second set of drops 134B. After the third set of drops 134C has been deposited, the arm 200 may move the gripper 250 and the parts 510, 520 in the first direction 560 with respect to the nozzle 122. Then, the arm 200 may move the gripper 250 and the parts 510, 520 in the second direction 562 with respect to the nozzle 122 to allow the fourth set of drops 134D to be deposited in the first direction 560, as shown by arrow 574, such that the fourth set of drops 134D proceeds toward the third set of drops 134C.

The sets of drops 134A-134D may thus be arranged in the following order in the second direction 562: first set of drops 134A, second set of drops 134B, third set of drops 134C, fourth set of drops 134D. The sets of drops 134A-134D may cool and solidify to form the weld material 340 that joins (e.g., micro-welds) the parts 510, 520 together to form the butt joint assembly 530.

In FIG. 5C, the sets of drops 134A-134D may be deposited in the first direction 560, similar to FIGS. 5A and 5B; however, the sets of drops 134A-134D may be arranged in a different order. More particularly, the sets of drops 134A-134D may be arranged in the following order in the second direction 562: first set of drops 134A, third set of drops 134C, second set of drops 134B, fourth set of drops 134D. The benefit of performing this type of operation is to more evenly distribute the thermal input to the parts 510, 520 that are being joined. This is done by leaving a space between the most recently joined section and the next section to be joined, and then later going back to complete the area that was bypassed initially. This is advantageous in micro-welding thin metals because the risk for part deformation due to thermal stress is reduced. The sets of drops 134A-134D may cool and solidify to form the weld material 340 that joins (e.g., micro-welds) the parts 510, 520 together to form the butt joint assembly 530.

In the example shown, the arm 200 may move the gripper 250 and the parts 510, 520 in the second direction 562 with respect to the nozzle 122 to allow the first set of drops 134A to be deposited in the first direction 560, as shown by arrow 571. After the first set of drops 134A has been deposited, the arm 200 may move the gripper 250 and the parts 510, 520 in the first direction 560 with respect to the nozzle 122. Then, the arm 200 may move the gripper 250 and the parts 510, 520 in the second direction 562 with respect to the nozzle 122 to allow the second set of drops 134B to be deposited in the first direction 560, as shown by arrow 572, such that the second set of drops 134B proceeds toward the first set of drops 134A. However, a gap may be present between the first and second sets of drops 134A, 134B. After the second set of drops 134B has been deposited, the arm 200 may move the gripper 250 and the parts 510, 520 in the first direction 560 with respect to the nozzle 122. Then, the arm 200 may move the gripper 250 and the parts 510, 520 in the second direction 562 with respect to the nozzle 122 to allow the third set of drops 134C to be deposited in the gap between the first and second sets of drops 134A, 134B. The third set of drops 134C may be deposited in the first direction 560, as shown by arrow 573, such that the third set of drops 134C proceeds toward the first set of drops 134A and away from the second set of drops 134B. After the third set of drops 134C has been deposited, the arm 200 may move the gripper 250 and the parts 510, 520 in the first direction 560 with respect to the nozzle 122. Then, the arm 200 may move the gripper 250 and the parts 510, 520 in the second direction 562 with respect to the nozzle 122 to allow the fourth set of drops 134D to be deposited in the first direction 560, as shown by arrow 574, such that the fourth set of drops 134D proceeds toward the second set of drops 134B.

Figure 6:
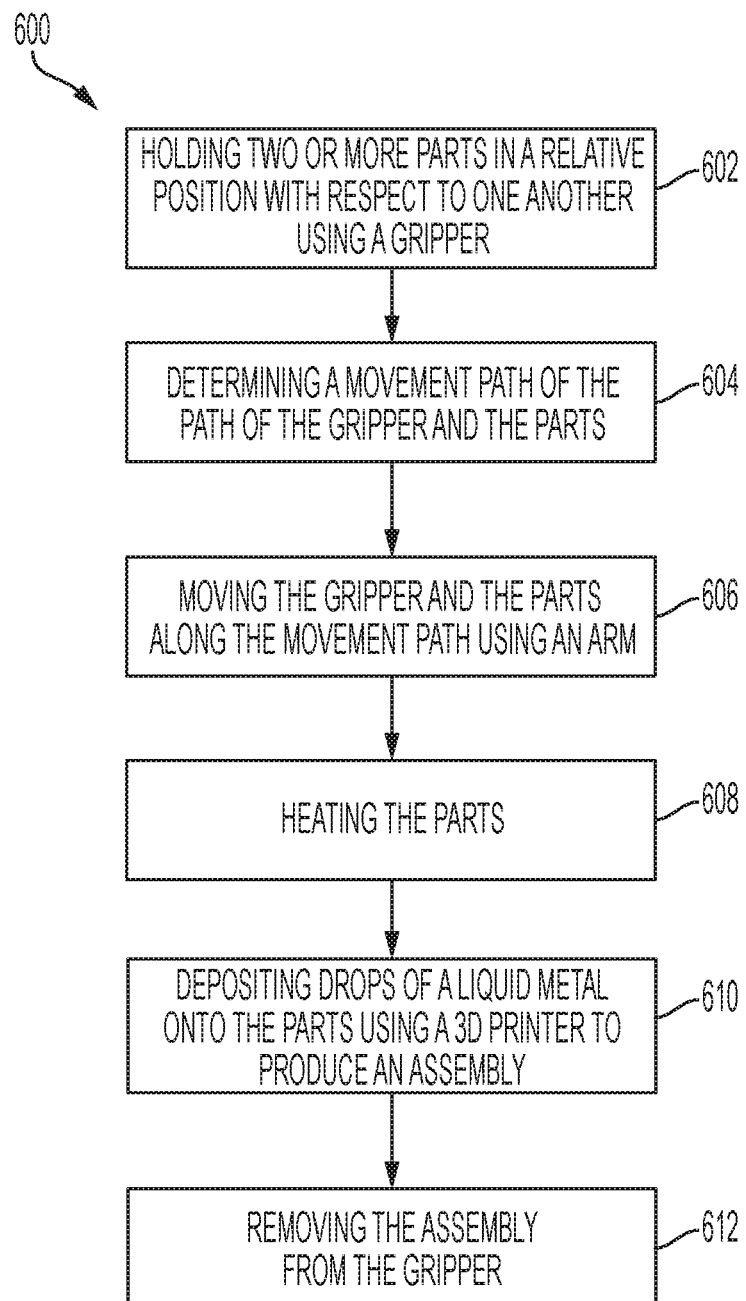
FIG. 6 depicts a flowchart of a method for joining (e.g., micro-welding) together two or more parts, according to an embodiment.

FIG. 6 depicts a flowchart of a method 600 for joining (e.g., micro-welding) two or more parts together, according to an embodiment. An illustrative order of the method 600 is provided below; however, one or more steps may be performed in a different order, performed simultaneously, repeated, or omitted. The method 600 may be performed by the system 100.

The method 600 may include holding two or more parts in a relative position with respect to one another using the gripper 250, as at 602. One or both parts may be held/gripped by the gripper 250. Illustrative positions are shown in FIGS. 3A-3H. The parts may be held in contact with one another, or the parts may be held with a small gap therebetween from about 0.1 mm to about 5 mm.

The method 600 may also include determining a movement path of the arm 200 and/or the gripper 250, as at 604. For example, the computing system 170 may determine a computer numerically controlled (CNC) movement path for the arm 200 and/or the gripper 250 with respect to the nozzle 122. The movement path may be based at least partially upon the relative position of the parts with respect to one another (e.g., in the gripper 250), the orientation of the parts with respect to one another, the position of the parts with respect to the nozzle 122, the orientation of the parts with respect to the nozzle 122, the size of the parts, the shape of the parts, the material of the parts, or a combination thereof.

The method 600 may also include moving the gripper 250 along the movement path using the arm 200, as at 606. The movement path may determine how the arm 200 moves the location of the gripper 250 (and the parts) in one, two, or three dimensions with respect to the 3D printer 105 (e.g., with respect to the nozzle 122). The movement path may also or instead determine how the arm 200 rotates or pivots the gripper 250 (and the parts) in one, two, or three dimensions with respect to the 3D printer 105 (e.g., with respect to the nozzle 122).

This step may cause relative movement between the nozzle 122 and the parts. In the embodiment shown, the part(s) may be gripped by the gripper 250, and the parts and the gripper 250 may move through the movement path while the nozzle 122 remains substantially stationary. In another embodiment, the 3D printer 105 and/or the nozzle 122 may be coupled to the arm 200 and moved through the movement path using the arm 200 while the part(s) remain substantially stationary.

As the arm 200 moves the gripper 250 through the movement path, a location on the parts (e.g., an intersection between the parts) that is to receive the drops 134/weld material 340 passes in front of (e.g., below) the nozzle 122. While moving through the movement path, a distance between the nozzle 122 and the location on the parts (e.g., an intersection between the parts) that is to receive the drops 134/weld material 340 may be maintained from about 0.5 mm and about 10 mm, or from about 1 mm to about 5 mm. For example, the distance may remain substantially constant.

The method 600 may also include heating one or both parts, as at 608. In one embodiment, the part(s) may be heated prior to being gripped by the gripper 250. In another embodiment, the part(s) may be heated while being gripped by the gripper 250 by the heater 252 that is coupled to and/or positioned within the gripper 250. The part(s) may be heated to a temperature from about 100° C. to about 600° C., about 300° C. to about 550° C., or about 400° C. to about 500° C. prior to the drops 134 of the liquid metal being jetted/deposited onto the part(s).

The method 600 may also include jetting/depositing the drops of liquid metal 134 onto the parts (e.g., including the intersection between the parts) using the 3D printer 105, as at 610. The drops 134 may have an average cross-sectional length (e.g., diameter) from about 100 μm to about 800 μm or about 200 μm to about 500 μm. The drops 134 may have a mass from about 0.05 mg to about 0.50 mg, about 0.10 mg to about 0.30 mg, or about 0.15 mg to about 0.20 mg. The drops 134 may be jetted/deposited at a rate from about 50 Hz to about 1000 Hz or about 100 Hz to about 500 Hz. The spacing between drops 134 may be from about 0.1 mm to about 2 mm, about 0.1 mm to about 0.5 mm, about 0.5 mm to about 1 mm, or about 1 mm to about 2 mm.

In at least one embodiment, steps 606, 608, and/or 610 may be performed simultaneously. As a result, the drops 134 may be deposited to form a line of the liquid metal on the parts, including the intersection between the parts. The line may be continuous, or in discrete intervals with gaps therebetween (i.e., spaced-apart drops 134). The line may be straight or curved. The line may be formed at a rate from about 0.1 cm/second to about 25 cm/second, about 0.5 cm/second to about 1 cm/second, about 1 cm/second to about 3 cm/second, about 3 cm/second to about 5 cm/second, about 5 cm/second to about 10 cm/second, or about 10 cm/second to about 25 cm/second. This is faster than conventional TIG micro-welding techniques. For example, the drops 134 may be jetted/deposited at a rate of about 500 Hz with a spacing between drops of about 0.5 mm, resulting in the line being formed at a rate from about 10 cm/second to about 25 cm/second. The line may have a length from about 1 mm to about 100 cm, about 1 mm to about 1 cm, about 1 cm to about 10 cm, or about 10 cm to about 100 cm. The line may have a width from about 0.4 mm to about 2 mm or about 0.55 mm to about 1.5 mm. For example, the nominal or average width may be about 0.7 mm. The line may have a height from about 0.01 mm to about 0.4 mm or about 0.03 mm to about 0.24 mm. For example, the nominal or average height may be about 0.15 mm.

The line of liquid metal formed by the drops 134 may solidify to form a line of the weld material 340, which may join (e.g., micro-weld) the part together to form the assembly. This may be referred to as micro-structure welding. The method 600 may also include removing the assembly from the gripper 250, as at 612. The method 600 may then loop back to 602 and repeat with new/different parts.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A system, comprising:
a three-dimensional (3D) printer configured to deposit drops of a liquid metal onto a first part and a second part, wherein a first set of the drops and a second set of the drops are aligned, wherein the second set of the drops is positioned closer to a beginning of the depositing of the first set of the drops than to an end of the depositing of the first set of the drops, and wherein the liquid metal subsequently solidifies to join the first part and the second part together to produce an assembly.

2. The system of claim 1, further comprising:
a gripper configured to hold the first part and the second part in contact with one another; and
an arm configured to move the gripper, the first part, and the second part simultaneously with the 3D printer introducing the liquid metal onto the first part and the second part.

3. The system of claim 2, wherein the arm comprises two or more segments and two or more joints, which allow the arm to:
move the gripper, the first part, and the second part in three dimensions simultaneously with the 3D printer introducing the liquid metal onto the first part and the second part; and
rotate the gripper, the first part, and the second part in three dimensions simultaneously with the 3D printer introducing the liquid metal onto the first part and the second part.

4. The system of claim 2, wherein the gripper is configured to grip the first part and the second part while a tab of the first part is positioned at least partially within a slot of the second part, and wherein the 3D printer is configured to introduce the liquid metal onto the first part and the second part proximate to an intersection of the tab and the slot.

5. The system of claim 2, wherein the gripper is configured to grip the first part and the second part such that a gap is defined therebetween, wherein the 3D printer is configured to introduce the liquid metal into the gap such that the liquid metal contacts an end of the first part and an end of the second part, and wherein the assembly comprises a butt joint assembly.

6. The system of claim 2, wherein the gripper is configured to grip the first part and the second part such that a side of the first part is in contact with a side of the second part, wherein the 3D printer is configured to introduce the liquid metal onto the side of the first part and onto an end of the second part, and wherein the assembly comprises a lap joint assembly.

7. The system of claim 2, wherein the gripper is configured to grip the first part and the second part such that an end of the first part is in contact with a side of the second part, wherein the 3D printer is configured to introduce the liquid metal onto a side of the first part and onto the side of the second part, and wherein the assembly comprises a corner joint assembly or a tee joint assembly.

8. The system of claim 2, wherein the gripper is configured to grip the first part and the second part such that a side of the first part is in contact with a side of the second part, wherein the 3D printer is configured to introduce the liquid metal onto an end of the first part and onto an end of the second part, and wherein the assembly comprises an edge joint assembly.

9. The system of claim 1, wherein the 3D printer is configured to deposit the liquid metal along an intersection of the first part and the second part at a rate from about 0.1 cm/second to about 25 cm/second, at a frequency from about 200 Hz to about 800 Hz, and with a spacing between the drops from about 0.2 mm to about 0.8 mm.

10. The system of claim 1, wherein the 3D printer is configured to introduce the drops onto the first part and the second part, wherein the drops have an average cross-sectional length from about 100 μm to about 800 μm and an average mass from about 0.05 mg to about 0.50 mg.

11. A system, comprising:
a gripper configured to hold a first part and a second part in a relative position with respect to one another;
an arm configured to move the gripper, the first part, and the second part in three dimensions while the gripper holds the first part and the second part in the relative position with respect to one another; and
a three-dimensional (3D) printer configured to deposit drops of a liquid metal onto the first part, the second part, or both while the gripper holds the first part and the second part in the relative position with respect to one another, wherein the 3D printer is configured to introduce the drops of the liquid metal at a rate from about 1 cm/second to about 25 cm/second onto the first part, the second part, or both, wherein the 3D printer is configured to introduce the drops of the liquid metal at a frequency from about 50 Hz to about 1000 Hz onto the first part, the second part, or both, wherein a first set of the drops and a second set of the drops are aligned, wherein the second set of the drops is positioned closer to a beginning of the depositing of the first set of the drops than to an end of the depositing of the first set of the drops, and wherein the liquid metal solidifies to join the first part and the second part together to produce an assembly.

12. The system of claim 11, wherein the 3D printer is configured to introduce the drops of the liquid metal onto the first part and the second part while the arm moves the gripper, the first part, and the second part.

13. The system of claim 11, wherein the 3D printer is configured to introduce the drops of the liquid metal onto the first part and the second part during pauses between when the arm moves the gripper, the first part, and the second part.

14. The system of claim 11, wherein a spacing between the drops of the liquid metal on the first part, the second part, or both is from about 0.1 mm to about 1 mm.

15. The system of claim 11, wherein the drops of the liquid metal have an average cross-sectional length from about 100 μm to about 1000 μm and an average mass from about 0.05 mg to about 0.50 mg.

16. A system, comprising:
a gripper configured to hold a first part and a second part in a relative position with respect to one another;
an arm configured to move the gripper, the first part, and the second part in three dimensions while the gripper holds the first part and the second part in the relative position with respect to one another; and
a three-dimensional (3D) printer configured to deposit drops of a liquid aluminum onto the first part and the second part simultaneously with the arm moving the gripper, the first part, and the second part, wherein the 3D printer is configured to introduce the drops at a rate from about 1 cm/second to about 25 cm/second and at a frequency from about 300 Hz to about 700 Hz, wherein a spacing between the drops on the first part and the second part is from about 0.3 mm to about 0.7 mm, wherein the drops have an average cross-sectional length from about 200 μm to about 500 μm and an average mass from about 0.10 mg to about 0.30 mg, wherein a first set of the drops and a second set of the drops are aligned, wherein the second set of the drops is positioned closer to a beginning of the depositing of the first set of the drops than to an end of the depositing of the first set of the drops, and wherein the drops solidify to join the first part and the second part together to produce an assembly.

17. The system of claim 16, wherein the arm is also configured to rotate the gripper, the first part, and the second part in three dimensions while the gripper holds the first part and the second part in the relative position with respect to one another.

18. The system of claim 17, wherein the 3D printer is also configured to introduce the drops of the liquid aluminum onto the first part and the second part simultaneously with the arm rotating the gripper, the first part, and the second part.

19. The system of claim 16, wherein the 3D printer is configured to introduce the drops of the liquid aluminum to form a line of the liquid aluminum on the first part and the second part, and wherein the line has a length from about 1 mm to about 100 cm, a width from about 0.4 mm to about 2 mm, and a height from about 0.01 mm to about 0.4 mm.

20. The system of claim 16, wherein the arm is configured to maintain a distance between a nozzle of the 3D printer and locations on the first part and the second part onto which the drops of the liquid aluminum are deposited while the arm moves the gripper, the first part, and the second part, and wherein the distance is from about 1 mm to about 5 mm.

* * * * *